US011762761B2

(12) United States Patent
McShane et al.

(10) Patent No.: US 11,762,761 B2
(45) Date of Patent: Sep. 19, 2023

(54) GENERATING SYNTHETIC TEST CASES FOR NETWORK FUZZ TESTING (71) Applicant: Robert Bosch GmbH, Stuttgart (DE)

(72) Inventors: John McShane, Waterford, MI (US); Timothy S. Arntson, Ypsilanti, MI (US); Zachariah Thomas Pelletier, Ypsilanti, MI (US)

(73) Assignee: Robert Bosch GmbH, Stuttgart (DE)

( * ) Notice: Subject to any disclaimer, the term of this patent is extended or adjusted under 35 U.S.C. 154(b) by 94 days.

(21) Appl. No.: 17/592,191

(22) Filed: Feb. 3, 2022

(65) Prior Publication Data
US 2022/0269591 A1 Aug. 25, 2022

Related U.S. Application Data (60) Provisional application No. 63/151,384, filed on Feb. 19, 2021.

(51) Int. Cl.
*G06F 11/00* (2006.01)
*G06F 11/36* (2006.01)
*G06N 3/08* (2023.01)

(52) U.S. Cl.
CPC .......... *G06F 11/3684* (2013.01); *G06N 3/08* (2013.01)

(58) Field of Classification Search
CPC .............................. G06F 11/3684; G06N 3/08
See application file for complete search history.

(56) References Cited

U.S. PATENT DOCUMENTS

| | | | |
|---|---|---|---|
| 10,146,893 B1 | 12/2018 | Evans et al. | |
| 10,402,561 B2 | 9/2019 | Ning et al. | |
| 10,614,216 B2 | 4/2020 | Srivastava et al. | |
| 10,785,264 B2 | 9/2020 | Park et al. | |
| 10,992,705 B2 | 4/2021 | Shin et al. | |
| 11,341,410 B1* | 5/2022 | Johnson | G06N 5/01 |

(Continued)

OTHER PUBLICATIONS

BeyondSecurity by HelpSystems, "Regarding Fuzzers: Black box, security testing", <https://beyondsecurity.com/fuzzer-bestorm-whitepaper.html>, 2020, 8 pages.

(Continued)

*Primary Examiner* — Joshua P Lottich
(74) *Attorney, Agent, or Firm* — Michael Best & Friedrich LLP (57) ABSTRACT

A system for generating synthetic test cases for fuzz testing. One example includes an electronic processor. The electronic processor is configured to pre-process training data, use the training data to train a discriminator DNN to evaluate a test case to determine whether the test case is likely to expose a software vulnerability, and use the discriminator DNN to train a generator DNN to generate a test case that is likely to expose a software vulnerability. The electronic processor uses the discriminator DNN to train the generator DNN by determining whether a test case generated by the generator DNN is likely to expose a software vulnerability and sending a determination of whether the test case generated by the generator DNN is likely to expose a software vulnerability to the generator DNN. The electronic processor is further configured to, when the generator DNN is trained, generate one or more test cases.

18 Claims, 5 Drawing Sheets

(56) References Cited

U.S. PATENT DOCUMENTS

| | | | |
|---|---|---|---|
| 2019/0258953 A1 | 8/2019 | Lang et al. | |
| 2020/0125943 A1* | 4/2020 | Copty | G06N 3/043 |
| 2020/0183816 A1* | 6/2020 | Copty | G06F 11/3688 |
| 2020/0213351 A1 | 7/2020 | Shin et al. | |
| 2020/0241954 A1* | 7/2020 | Venkataramani | G06N 3/088 |
| 2020/0327420 A1* | 10/2020 | Aralikatte | G06N 3/045 |
| 2020/0380336 A1* | 12/2020 | Chowdhury | G06N 3/044 |
| 2022/0085878 A1* | 3/2022 | Li | G06F 18/2431 |

OTHER PUBLICATIONS

Bradshaw, "An introduction to fuzzing: using fuzzers (SPIKE) to find vulnerabilities", Infosec, <https://resources.infosecinstitute.com/topic/intro-to-fuzzing/>, 2010, 14 pages.

CaringCaribou, "A friendly car security exploration tool for the CAN bus", <https://github.com/CaringCaribou/caringcaribou>, 2021, 7 pages.

Chollet, "The Sequential Model", Keras Developer Guides, <https://keras.io/guides/sequential_model/>, 2020, 7 pages.

Costa, "Best Python Libraries for Machine Learning and Deep Learning", <https://towardsdatascience.com/best-python-libraries-for-machine-learning-and-deep-learning-b0bd40c7e8c>, 2020, 19 pages.

Gao et al., "EM-Fuzz: Augmented Firmware Fuzzing via Memory Checking", IEEE Transactions on Computer-Aided Design of Integrated Circuits and Systems, vol. 39, No. 11, 2020, pp. 3420-3432.

GitLab, "DevSecOps with GitLab", <https://about.gitlab.com/solutions/dev-sec-ops/>, 2019, 12 pages.

Godefroid et al., "Learn&Fuzz: Machine Learning for Input Fuzzing", arXiv, <https://arxiv.org/pdf/1701.07232.pdf>, 2017, 18 pages.

Intrepid Control Systems, "What's new in Vehicle Spy 3.9.2", <https://intrepidcs.com/whats-new-in-vehicle-spy-3-9-2/>, 2020, 7 pages.

Nishimura et al., "Implementation of the CAN-FD Protocol in the Fuzzing Tool beSTORM", IEEE International Conference on Vehicular Electronics and Safety, 2016, 6 pages.

Pham et al., "AFLnet: A Greybox Fuzzer for Network Protocols", IEEE Conference on Software Testing, Validation and Verification, 2020, 6 pages.

Radford et al., "Unsupervised Representation Learning with Deep Convolutional Generative Adversarial Networks", ICLR 2016, 16 pages.

Schutzwerk, "A Security Analysis Toolkit for Proprietary Car Protocols Canalyzator", 2018, <https://www.schutzwerk.com/en/43/posts/canalyzat0r/>, 13 pages.

Snyopsys, "Defensics Fuzz Testing", <https://www.synopsys.com/software-integrity/security-testing/fuzz-testing.html>, 2017, 8 pages.

Tensorflow Documentation, "tf.keras.model.predict", <https://www.tensorflow.org/api_docs/python/tf/keras/Model>, 2020, 39 pages.

Tensorflow Documentation, "tf.keras.optimizers.Adam", <https://www.tensorflow.org/api_docs/python/tf/keras/optimizers/Adam>, 2020, 9 pages.

Unknown, "american fuzzy lop (2.52b)", <https://Icamtuf.coredump.cx/afl>, 2020, 7 pages.

Yue et al., "LearnAFL: Greybox Fuzzing With Knowledge Enhancement", IEEE Access, 2019, pp. 117029-117043.

* cited by examiner

GENERATING SYNTHETIC TEST CASES FOR NETWORK FUZZ TESTING

RELATED APPLICATIONS

This application claims priority to U.S. Provisional Patent Application No. 63/151,384, filed Feb. 19, 2021, the entire content of which is hereby incorporated by reference.

FIELD

Embodiments relate to systems and methods for generating synthetic test cases for fuzz testing, for example, controller area network (CAN) bus fuzz testing.

SUMMARY

Many modern vehicles are equipped with complex computational systems (for example, electronic control units (ECUs)) to perform various vehicle related functions. ECUs may communicate with one another via messages (for example, a series of bits) sent on a communication network (for example, a CAN bus). ECUs may be vulnerable to issues such as program crashes, memory corruption, and extreme resource usage issues. These issues or software vulnerabilities may occur when an ECU receives a corrupt message. A corrupt message can be sent due to a software error, and intentional attack by a hacker, or the like. As a result, equipment manufacturers, vehicle owners, maintenance and repair technicians, and others use techniques such as fuzzing to identify potential vulnerabilities before they are exploited. Fuzzing allows the software run on ECUs to be fortified to deal with different types of test cases (for example, a corrupt message). For example, when a vulnerability is identified, a software technician may alter the software code to address the identified vulnerability.

The systems and methods described herein allow for the generation of synthetic test cases for fuzz testing. To aide vehicle manufacturers and technicians in identifying ECU vulnerabilities, a system which generates synthetic test cases for fuzzing that are likely to identify vulnerabilities yet are somewhat random. Synthetic test cases are those that are generated by a machine learning model rather than a technician, reducing the amount of time that is needed to fuzz an ECU. It is important that test cases have an element of randomness in order to identify new types of test cases or corrupt messages. Many machine learning models are only trained to generate new test cases based on test cases that are already known to produce an error, therefore without an element of randomness these machine learning models are unlikely to generate new types of test cases to find the unknown vulnerabilities hackers are looking to exploit in ECUs (this issue is sometimes referred to as overfitting). To generate synthetic test cases for fuzzing that are likely to identify vulnerabilities yet are somewhat random, systems and methods described herein utilize, among other things, a general adversarial network (GAN).

One example provides a system for generating synthetic test cases for fuzz testing. The system includes an electronic processor. The electronic processor is configured to pre-process training data and use the training data to train a discriminator DNN to evaluate a test case to determine whether the test case is likely to expose a software vulnerability. The electronic processor is also configured to use the discriminator DNN to train a generator DNN to generate a test case that is likely to expose a software vulnerability. The electronic processor uses the discriminator DNN to train the generator DNN by determining whether a test case generated by the generator DNN is likely to expose a software vulnerability and sending a determination of whether the test case generated by the generator DNN is likely to expose a software vulnerability to the generator DNN. The electronic processor is further configured to, when the generator DNN is trained, generate, using the generator DNN, one or more test cases.

Another example provides a method for generating synthetic test cases for fuzz testing. The method includes pre-processing training data, using the training data to train a discriminator DNN to evaluate a test case to determine whether the test case is likely to expose a software vulnerability, and using the discriminator DNN to train a generator DNN to generate a test case that is likely to expose a software vulnerability. The discriminator DNN trains the generator DNN by determining whether a test case generated by the generator DNN is likely to expose a software vulnerability and sending a determination of whether the test case generated by the generator DNN is likely to expose a software vulnerability to the generator DNN. The method further includes, when the generator DNN is trained, generating, using the generator DNN, one or more test cases.

Other aspects, features, and embodiments will become apparent by consideration of the detailed description and accompanying drawings.

DETAILED DESCRIPTION

Before any embodiments are explained in detail, it is to be understood that the disclosure is not intended to be limited in its application to the details of construction and the arrangement of components set forth in the following description or illustrated in the following drawings. Embodiments are capable of other configurations and of being practiced or of being carried out in various ways.

A plurality of hardware and software-based devices, as well as a plurality of different structural components may be used to implement various embodiments. In addition, embodiments may include hardware, software, and electronic components or modules that, for purposes of discussion, may be illustrated and described as if most of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more electronic processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
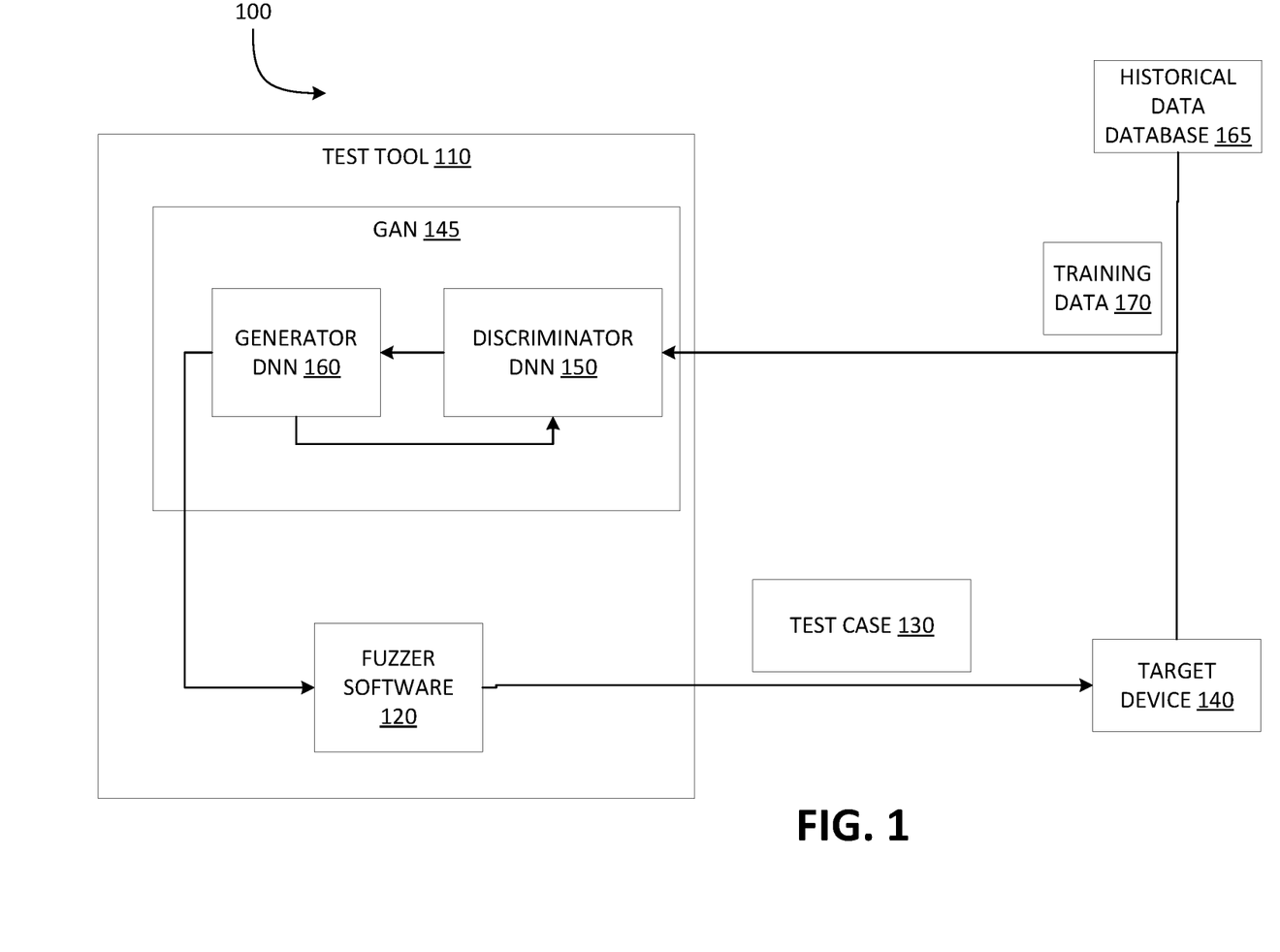
FIG. 1 illustrates an example system for generating synthetic test cases for fuzz testing according to some embodiments.

FIG. 1 illustrates an example system 100 for generating synthetic test cases for fuzz testing. The system 100 includes various hardware and software components configured to obtain and provide information, and processes the information, for example, by executing one or more software instructions or programs. In the example illustrated, system 100 includes a test tool 110. In some embodiments, the test tool 110 is electrically coupled to a network (for example, a controller area network (CAN) bus) and figured to obtain and provide information to and from the network.

In some embodiments, the test tool includes fuzzer software 120, which may be implemented in software stored on a memory associated with the test tool 110 and executable by an electronic processor associated with the test tool 110. In some embodiments, the fuzzer software 120 is configured to sends test cases via a communication network to one or more ECUs (for example, the target device 140) to identify vulnerabilities in software associated with the ECUs.

In some embodiments, the target device 140 includes an electronic processor (for example, an electronic microprocessor, microcontroller, or other suitable programmable device), a memory, and an input/output interface. In some embodiments, an electronic processor associated with target device 140 generates data in response to receiving a test case 130. In some embodiments, the data generated by target device 140 in response to receiving the test case 130 includes information that indicates an error in the target device 140. For example, the software code being executed by the target device 140 may throw an exception in response to a test case and the target device 140 may generate an output log including an indication of the exception that was thrown and the test case that caused the exception to be thrown. In some embodiments, the data generated by the target device 140 is encrypted and stored into structured query language (SQL) server or database such as the historical data database 165. In some embodiments, data generated by the target device 140 is sent to the fuzzer software 120 and the fuzzer software 120 sends the data generated by the target device 140 to the historical data database 165. In some embodiments, data generated by the target device 140 is sent to the discriminator dense neural network (DNN) described below.

The system 100 also includes a GAN 145 which may be implemented in software executable by an electronic processor. In some embodiments, the GAN 145 is implemented in the test tool 110 as illustrated in and described in relation to FIG. 1 and FIG. 3. In other embodiments, the GAN 145 is implemented in an electronic controller remote to but in communication with (via for example, a wired or wireless communication network) the test tool 110. In some embodiments, the GAN 145 includes a discriminator dense neural network (DNN) 150, and a generator dense neural network (DNN) 160. A dense neural network (DNN) is also known in the art as a recurrent neural network (RNN).

In some embodiments, the discriminator DNN 150 receives training data 170 from the historical data database 165, the target device 140, or both. In some embodiments, the discriminator DNN 150 is trained using the training data 170 to determine whether a test case will test a vulnerability of an ECU. For example, the discriminator DNN 150 may label a test case as a "pass case" if it determines the test case will not test a vulnerability of an ECU and a "fail case" if it determines the test case will test a vulnerability of an ECU. In some embodiments, a score that is a value between 0 and 1 is generated by the discriminator DNN 150 and is used to classify a test case as a "pass case" or a "fail case." For example, the threshold for labeling a test case as a "fail case" may be 0.7 and the discriminator DNN 150 may generate a numeric value (or score) of 0.986 for a test case. Because the value 0.986 is greater than 0.7, the discriminator DNN 150 may label the test case as a "fail case."

In some embodiments, the discriminator DNN 150 is implemented using an artificial intelligence algorithm library such as TensorFlow ®. In some embodiments, the discriminator DNN 150 is a sequential model for making predictions, wherein each layer of the discriminator DNN 150 has one input tensor and one output tensor. In some embodiments, a separate correlation model is built for every feature of a test case and four separate dense layers are added to each correlation model. In some embodiments, the discriminator DNN 150 is compiled using a stochastic gradient descent method (for example, the Adam optimizer from the TensorFlow® library) with a learning rate of 0.001. In some embodiments, a loss function is used to determine how well the discriminator DNN 150 is progressing in modeling the training data. In some embodiments, the discriminator DNN 150 is compiled using the mean absolute error of the payloads according to which a score is generated by the discriminator DNN 150. In some embodiments, the discriminator DNN 150 is trained using the TensorFlow® fit function by supplying the discriminator DNN 150 with a number of learning interactions (training epochs), labeled training data, and a validation split of 0.2 (20% of the training data 170 will be used to validate the discriminator DNN 150).

In some embodiments, after the discriminator DNN 150 is compiled and fitted to the data, the discriminator DNN 150 is used to predict whether or not a test case would likely cause a failure or test a vulnerability in the target device 140, as described above. In some embodiments, the prediction is accomplished using the TensorFlow® "Predict" function by taking an example vector that matches the shape of input training data and outputs a floating-point integer that represents the probability (or percentage) chance that the input value matches the given label.

In some embodiments, the generator DNN 160 is trained by the discriminator DNN 150 to generate test cases that are likely to expose a software vulnerability. Once the generator DNN is trained, it generates one or more test cases and sends the one or more test cases to the fuzzer software 120. In some embodiments, the fuzzer software 120 in turn, provides a test case received from the generator DNN 160 (for example, the test case 130) to the target device 140.

Figure 2:
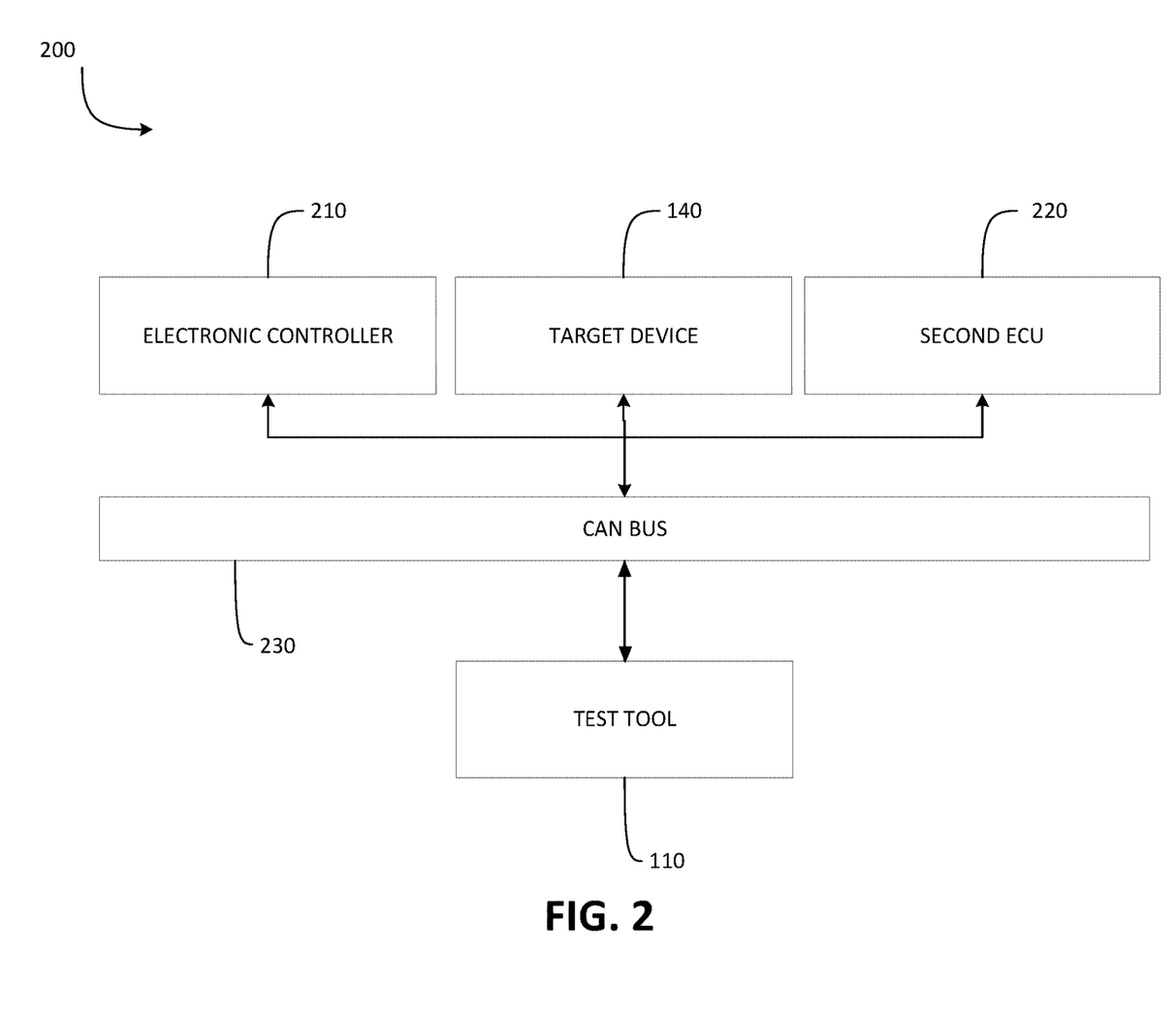
FIG. 2 is a block diagram of an example system for fuzz testing according to some embodiments.

FIG. 2 illustrates an example system 200 for network testing. In the example illustrated, the system 200 includes an electronic controller 210, the target device 140, a second ECU 220, and the test tool 110 connected via a communication network 230. In the example illustrated, the communication network 230 is a controller area network (CAN) and a CAN protocol is utilized. Techniques described herein may be applied, for example, at the transport layer of a network other than a CAN. For example, the communication network 230 may be implemented using other network modalities including, for example, a wide area network, such as the Internet, a local area network, such as a Wi-Fi network, short-range wireless networks, such as Bluetooth™ network, near field communication connections, and combinations or derivatives thereof. Rather than using a CAN protocol, other network protocols such as a Transmission Control Protocol (TCP), Ethernet, Internet Protocol version 4 (Ipv4), and the like may be used. The embodiment illustrated in FIG. 2 provides but one example of the components and connections of the system 200. In other embodiments, these components and connections may be constructed in other ways than those illustrated and described herein. For example, the system 200 may include a different number of devices than the number of devices illustrated in FIG. 2.

In some embodiments, rather than including devices, the system 200 may include software modules (for example, software methods, software classes, or the like) which may be tested by the fuzzer software 120. For example, the fuzzer software 120 may communicate using a Software-in-the Loop (SIL) protocol (rather than the CAN protocol illustrated in FIG. 2) and communicate with compiled software modules rather than devices. In this example, the target device 140 would be a software method or class configured to receive data or messages from another class, from another method, via a communication network, or the like. In some embodiments, the fuzzer software 120 may be in communication with uncompiled source code (for example, C code, Python code, or the like) to determine whether there are unhandled exceptions within the source code. In this example, no network protocol would be used.

The test tool 110 is configured to, among other things, generate synthetic test cases for the communication network 230. The test tool 110 is configured to receive a signal from the communication network 230 representing one or more signals generated by the electronic controller 210, the target device 140, and the second ECU 220. The test tool 110 may, for example, be a desktop computer, a server, a laptop, a diagnostic tool, or the like. The test tool 110 executes, among other things, instructions related to the processes and methods described herein. While the test tool 110 is described herein as implementing a GAN for generating synthetic test cases for the communication network 230, it is to be understood that the test tool 110 may be implemented using other machine learning methods.

Figure 3:
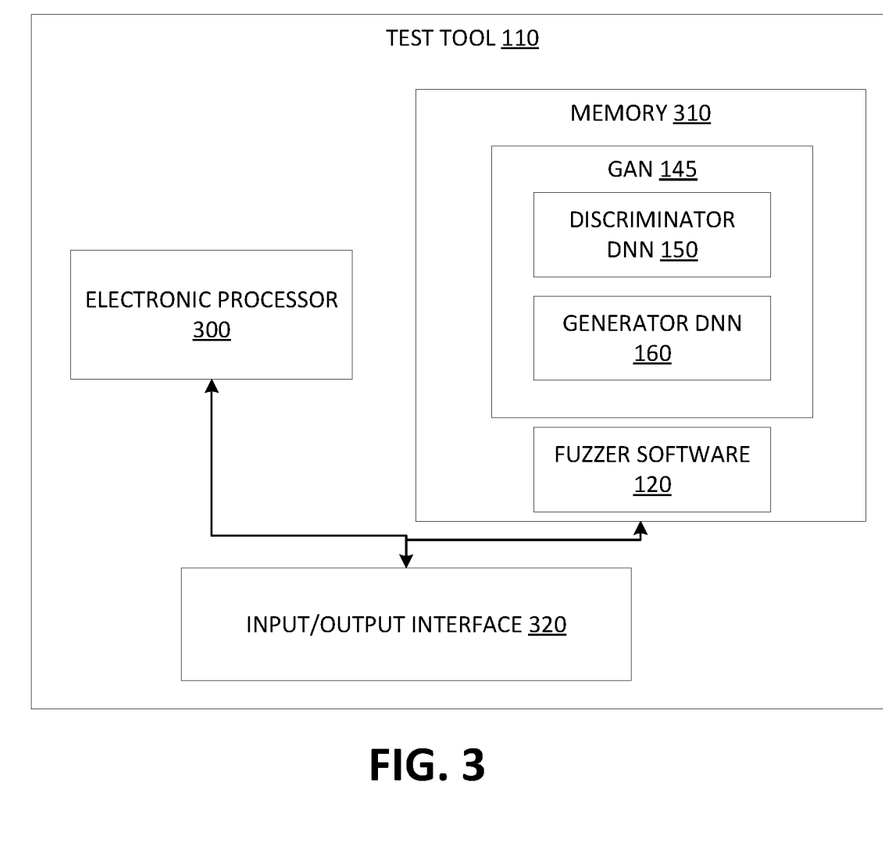
FIG. 3 is an illustrative example of a test tool included in the system of FIG. 1 according to some embodiments.

As shown in FIG. 3, the test tool 110 includes, among other things, an electronic processor 300 (for example, an electronic microprocessor, microcontroller, or other suitable programmable device), a memory 310, and an input/output interface 320. The electronic processor 300, the memory 310, and the input/output interface 320, are communicatively connected. In some embodiments, the electronic processor 300 includes or is implemented using various hardware (for example, using a programmable microprocessor, a field-programmable gate array ("FPGA"), an application specific integrated circuit ("ASIC"), or other devices.

The electronic processor 300 obtains and provides information (for example, from the memory 310 and/or the input/output interface 320), and processes the information by executing one or more software instructions or modules, capable of being stored, for example, in a random access memory ("RAM") area of the memory 310 or a read only memory ("ROM") of the memory 310 or another non-transitory computer readable medium (not shown). The software can include firmware, one or more applications, program data, filters, rules, one or more program modules, and other executable instructions.

The memory 310 can include one or more non-transitory computer-readable media and includes a program storage area and a data storage area. As used in the present application, "non-transitory computer-readable media" comprises all computer-readable media but does not consist of a transitory, propagating signal. The program storage area and the data storage area can include combinations of different types of memory, for example, read-only memory ("ROM"), random access memory ("RAM"), electrically erasable programmable read-only memory ("EEPROM"), flash memory, or other suitable digital memory devices. The electronic processor 300 is connected to the memory 310 and executes software, including firmware, one or more applications, program data, filters, rules, one or more program modules, and other executable instructions. The electronic processor 300 retrieves from the memory 310 and executes, among other things, instructions related to the control processes and methods described herein. In some embodiments, the memory 310 stores or contains the GAN 145 and the fuzzer software 120.

The input/output interface 320 is configured to receive input and to provide system output. The input/output interface 320 obtains information and signals from, and provides information and signals to (for example, over one or more wired and/or wireless connections) devices and/or components both internal and external to the system 200.

In some embodiments, the test tool 110 may include additional, fewer, or different components. For example, in some embodiments, the test tool 110 may include a transceiver or separate transmitting and receiving components, for example, a transmitter and a receiver. Some or all of the components of test tool 110 may be dispersed and/or integrated into other devices/components of the system 200.

Returning to FIG. 2, in some embodiments, the electronic controller 210 includes components similar to the test tool 110 and, accordingly, the description of the components of the test tool 110 similarly applies to the electronic controller 210. In some embodiments, the test tool 110 is only used for generating synthetic test cases and sending the test cases to devices being fuzz tested. Thus, in these embodiments, a secondary processing device, such as the electronic controller 210, may be implemented in the system 200 in order to process data generated by the target device 140 and the second ECU 220. For example, in one embodiment, the electronic controller 210 is an onboard computing device of a vehicle. It should be noted that although the functions of test tool 110 are described herein as being performed entirely by the test tool 110, it is possible the one or more of the functions of the test tool 110 to be performed entirely by the electronic controller 210.

Figure 4:
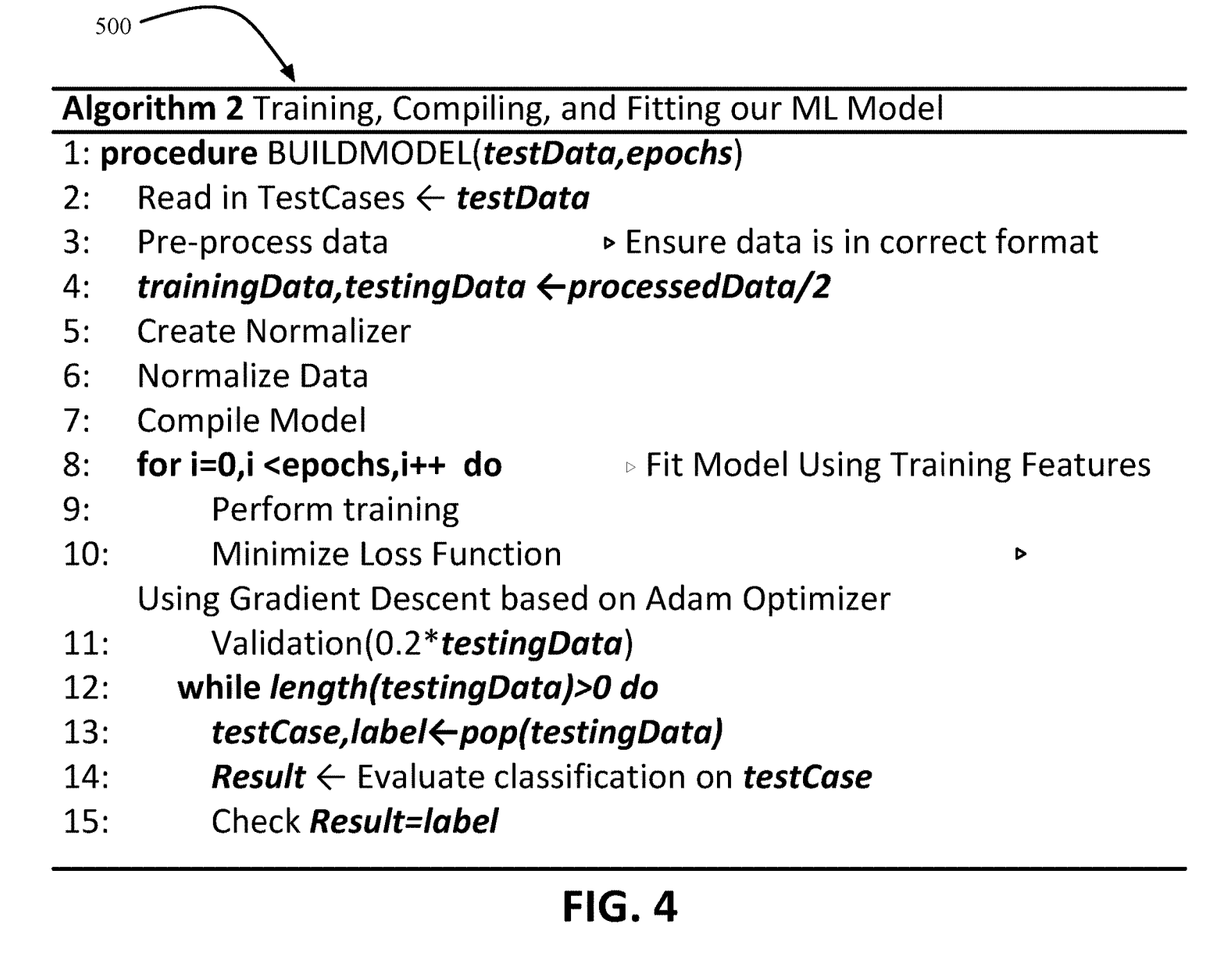
FIG. 4 is an illustrative example of pseudo-code for training, compiling, and fitting a discriminator DNN included in the system of FIG. 1 according to some embodiments.

FIG. 4 is an illustrative example of a pseudo-code 500 for training, compiling, fitting, and testing a machine learning model (such as the discriminator DNN 150). The pseudo-code 500 represents both portions of development efforts or processes as well as actual operations performed in components described herein. Therefore, in some embodiments, some of the logical steps of pseudo-code 500 are implemented in software (for example, stored in the memory 310) that is executed by electronic processor 300 of the test tool 110.

In some embodiments, pseudo-code 500 begins at line 1 wherein a function, BuildModel(testData,epochs), is called to initialize training, compiling, fitting, and testing the discriminator DNN 150. At lines 2-3, pseudo-code 500 receives data (for example, training data 170 from the historical data database 165) and pre-processes the data. An example embodiment of data pre-processing is discussed below with respect to FIG. 5. At line 4, pseudo-code 500 divides the pre-processed training data (shown in FIG. 4 as processedData) equally into two data groups, trainingData and testingData. At lines 5-6, pseudo-code 500 creates a normalizer and normalizes the trainingData and the testing- Data. An example embodiment of data normalization is discussed below with respect to FIG. 5. At line 7, the discriminator DNN 150 is compiled.

At lines 8-11, pseudo-code 500 performs a for loop to fit or train the discriminator DNN 150 using trainingData, wherein for a predetermined number of epochs (i), the pseudo-code 500 trains the discriminator DNN 150 and minimizes a loss function. The loss function may evaluate a change in the ability of discriminator DNN 150 to determine progress. As shown at line 11, a validation set of 20 percent of the testingData may be used by the loss function to evaluate the fit of the discriminator DNN 150 and tune the discriminator DNN 150 during training.

At lines 12-15, pseudo-code 500 initiates a while loop to test the performance of the discriminator DNN 150 after it has been trained at lines 8-11, wherein while the length of the testingData is greater than zero, the last element or test case included in the testingData array is assigned to the variable "testcase" and the label associated with the test case (for example, "pass case" or "fail case") is assigned to the variable "label." At line 14, the discriminator DNN 150 generates a score and a label for the test case assigned to the variable "testcase." The label generated by the discriminator DNN 150 is assigned to the variable "Result." At line 15, pseudo-code 500 determines if the label assigned to the variable "Result" is equal to or the same as the label assigned to the variable "label". In some embodiments, when, at lines 12-15 the discriminator DNN 150 is determined to perform unsatisfactorily (for example, the discriminator DNN 150 classified less than 80 percent of the test cases included in the testingData correctly), the training process described at lines 8-11 is repeated and, once the training process is complete, the testing process described at lines 12-15 is repeated. In some embodiments, the discriminator DNN 150 may be retrained periodically using new or updated training data.

Figure 5:
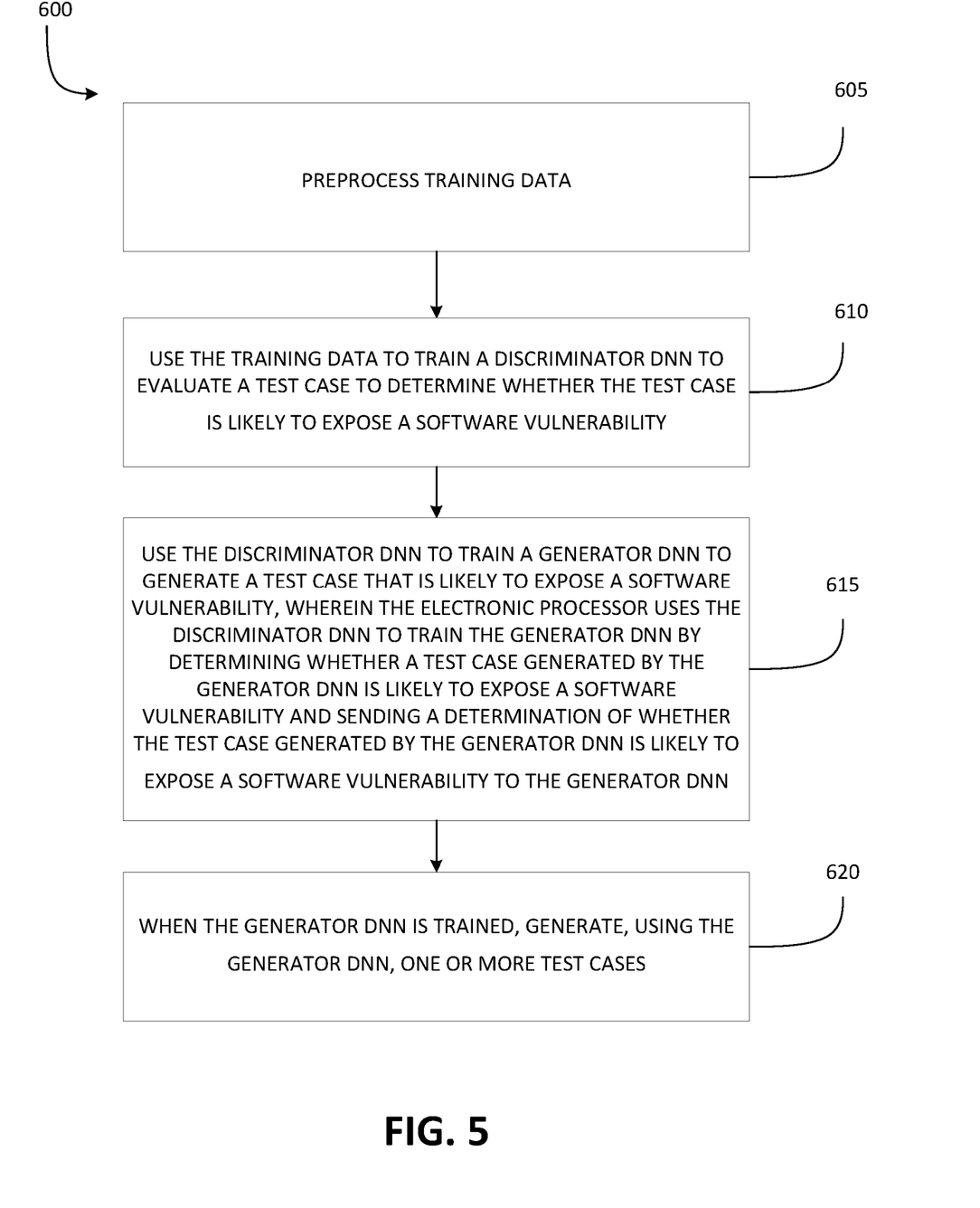
FIG. 5 is a flowchart illustrating a method of generating synthetic test cases for fuzz testing according to some embodiments.

FIG. 6 is a flowchart illustrating an example method 600 of generating synthetic test cases for fuzz testing.

In some embodiments, the method 600 begins when the test tool 110 receives training data, for example the training data 170. In some embodiments, the training data 170 includes output log files which represent, for example, a signal generated by an ECU in response to receiving a message via the CAN bus from, for example, the test tool 110 or another ECU. In some embodiments, the test tool 110 receives the training data 170 directly from the communication network 230. In other embodiments, the test tool 110 receives the training data 170 from the historical data database 165 or a memory associated with the electronic controller 210.

At block 605, the electronic processor 300 pre-processes the training data 170. The training data 170 is pre-processed at block 605 to ensure it is in a data format that will allow for efficient and effective training of the discriminator DNN 150. Pre-processing the training data 170 may guarantee that the training data 170 is representative of many, if not all, patterns present in the training data 170 and not skewed towards inconsistencies in the training data 170.

In some embodiments, the training data 170 may be padded to conform with a standard form of training data needed to train the discriminator DNN 150. For example, the discriminator DNN 150 may require that training data have a length of eight bytes. In this case, the electronic processor 300 may pad each instance or test case in the training data 170 which is shorter than eight bytes. In some embodiments, the electronic processor 300 may pad a test case in the training data 170 by filling empty bytes in the payload of the test case with a hexadecimal value 0xCC so that each payload in each test case included in the training data 170 is the same length.

In some embodiments, the electronic processor 300 normalizes the training data 170 before using the training data 170 to train the discriminator DNN 150. For example, the training data 170 may be manipulated by the test tool 110 such that it can be measured on a standard scale wherein the average of the data is zero. In some embodiments, the electronic processor 300 re-formats or converts the structure of the training data 170 to another form before it is used to train the discriminator DNN 150. For example, in one embodiment, the electronic processor 300 converts the training data 170 from Python list data to Tensor slices.

In some embodiments, the order of the instances included in the training data 170 is randomized by the electronic processor 300 before the training data 170 is used to train the discriminator DNN 150 to ensure that that there is no pre-existing order or defining split to the training data 170. It is to be understood that while the electronic processor 300 is described herein as performing a specific set of pre-processing procedures, the electronic processor 300 may perform different or additional pre-processing procedures than those described herein.

At block 610, the electronic processor 300 uses the training data 170 to train a discriminator DNN (for example, the discriminator DNN 150) to evaluate a test case to determine whether the test case is likely to expose a software vulnerability. In some embodiments, the discriminator DNN 150 may be trained to determine whether the test case is likely to expose a hardware vulnerability as well as or instead of a software vulnerability. An example of training the discriminator DNN 150 is described above in relation to FIG. 4.

At block 615, the electronic processor 300 uses the discriminator DNN 150 to train a generator DNN (for example, the generator DNN 160) to generate a test case that is likely to expose a software vulnerability, wherein the electronic processor 300 uses the discriminator DNN 150 to train the generator DNN 160 by determining whether the test case generated by the generator DNN 160 is likely to expose a software vulnerability and sending a determination of whether a test case generated by the generator DNN 160 is likely to expose a software vulnerability to the generator DNN 160.

For, example, in some embodiments, the generator DNN 160 is seeded with a randomized input which corresponds to the format of the training data 170 and trained using the discriminator DNN 150. While the generator DNN 160 is being trained by the discriminator DNN, the generator DNN 160 generates a test case and sends the test case it generated to the discriminator DNN 150 for evaluation. The discriminator DNN 150 scores and labels the test case generated by the generator DNN 160. In some embodiments, when the discriminator DNN 150 determines the test case to be a "pass case," the discriminator DNN 150 may send the label of "pass case," the score associated with the test case, or both to the generator DNN 160. Based on the score, the generator DNN 160 may adjust the test cases it is outputting and, based on its adjustments, send a new test case to the discriminator DNN 150 for evaluation. This process of adjustment by the generator DNN 160 and evaluation by the discriminator DNN 150 may continue until the discriminator DNN 150 determines that the generator DNN 160 has produced a predetermined number of test cases labeled by the discriminator DNN 150 as "fail cases." For example, the discriminator DNN 150 may require the generator DNN 160 to achieve a rate of 80 percent "fail cases" out of the total number of test cases generated. In some embodiments, the discriminator DNN 150 may perform a predetermined number of training sessions or epochs with the generator DNN 160. In each training session, the generator DNN 160 may be required to generate a predetermined number of test cases labeled by the discriminator DNN 150 as "fail cases" before the generator DNN 160 may pass a current training session and move to a next training session. In some embodiments, when the predetermined number of training sessions are completed, the generator DNN 160 is considered to be trained and ready to generate test cases to send to the fuzzer software 120 In some embodiments, the generator DNN 160 may be retrained periodically.

At block 620, when the generator DNN 160 is trained, the electronic processor 300 generates, using the generator DNN 160, one or more test cases.

For example, in one embodiment, if the generator DNN 160 has learned from the discriminator DNN 150 that test cases with arbitration IDs in the range of 0×6XX are more likely to cause a failure, the generator DNN 160 will generate synthetic test cases with arbitration IDs in the range of 0×6XX.

In some embodiments, when the generator DNN 160 is able to accurately generate synthetic test cases, the one or more synthetic test cases generated by the generator DNN 160 are transmitted to the fuzzer software 120. The fuzzer software 120 uses the synthetic test cases to identify one or more software vulnerabilities included in the target device 140. For example, the fuzzer software 120 may send one or more messages to the target device 140 based on the one or more test cases. It is to be understood that although the method 600 is discussed herein as being implemented with the use of a general adversarial network such as GAN 145, the method 600 may be implemented using other machine learning methods.

In some embodiments, if a test case passes (for example, the fuzzer software 120 does not receive an error from or determine an error occurred at the target device 140), the fuzzer software 120 sends inverse of the test case that passed to the target device 140. In some embodiments, if a test case fails (for example, the fuzzer software 120 does receives an error from the target device 140 or the target device 140 is unresponsive), the fuzzer software 120 sends similar test cases to the target device 140 to validate the failure. In some embodiments, data the fuzzer software 120 receives from or generates regarding the target device 140 during testing is sent by the electronic processor 300 to the historical data database 165 as, for example, an output log file.

In some embodiments, data the fuzzer software 120 receives from or generates regarding the target device 140 during testing is sent or output by the electronic processor 300 to a display device (for example, a display device included in the test tool 110) as, for example, an output log file. A software technician may view the output log via the display device and, using the data included in the output log, create a software patch (computer executable or readable instructions) to address a software vulnerability included in the output log. For example, in some embodiments, the electronic processor 300 receives, from a software technician, new or revised computer executable instructions to address a software vulnerability and sends the new or revised computer executable instructions to the target device 140 recorded as being associated with the software vulnerability in the output log. The new or revised computer executable instructions replace computer executable instructions that were previously stored in the memory of the target device 140. The new or revised computer executable instructions are designed to prevent the target device 140 from malfunctioning when, in the future, the electronic device receives data similar to the synthetic test case which caused it to be recorded as associated with a software vulnerability in the output log.

Various features, advantages, and embodiments are set forth in the following claims.

What is claimed is:

1. A system for generating synthetic test cases for fuzz testing, the system comprising:
    an electronic processor configured to:
        pre-process training data;
        use the training data to train a discriminator DNN to evaluate a test case to determine whether the test case is likely to expose a software vulnerability;
        use the discriminator DNN to train a generator DNN to generate a test case that is likely to expose a software vulnerability, wherein the electronic processor uses the discriminator DNN to train the generator DNN by determining whether a test case generated by the generator DNN is likely to expose a software vulnerability and sending a determination of whether the test case generated by the generator DNN is likely to expose a software vulnerability to the generator DNN; and
        when the generator DNN is trained, generate, using the generator DNN, one or more test cases.

2. The system according to claim 1, wherein the determination includes a label and a score.

3. The system according to claim 1, wherein the electronic processor is configured to determine that the generator DNN is trained when a predetermined number of training sessions are completed.

4. The system according to claim 3, wherein the electronic processor is configured to determine a training session is completed when the generator DNN produces a predetermined number of test cases likely to expose a software vulnerability.

5. The system according to claim 1, wherein the electronic processor is configured to pre-process the training data by performing at least one selected from the group comprising padding the training data, normalizing the training data, re-formatting the training data, randomizing the order of the training data.

6. The system according to claim 1, wherein the electronic processor is further configured to receive the training data from a historical data database, a target device, or both.

7. The system according to claim 1, wherein the electronic processor is configured to:
    send the one or more test cases from the generator DNN to a fuzzer; and
    use the fuzzer to test a target device or software module by sending the target device or software module one or more messages based on the one or more test cases.

8. The system according to claim 7, wherein the target device is an ECU included in a vehicle and configured to receive and send messages via a CAN bus.

9. The system according to claim 1, wherein the electronic processor is configured to:
    send the one or more test cases from the generator DNN to a fuzzer; and
    use the fuzzer to evaluate source code for unhandled exceptions.

10. A method for generating synthetic test cases for fuzz testing, the method comprising:
    pre-processing training data;

using the training data to train a discriminator DNN to evaluate a test case to determine whether the test case is likely to expose a software vulnerability;

using the discriminator DNN to train a generator DNN to generate a test case that is likely to expose a software vulnerability, wherein the discriminator DNN trains the generator DNN by determining whether a test case generated by the generator DNN is likely to expose a software vulnerability and sending a determination of whether the test case generated by the generator DNN is likely to expose a software vulnerability to the generator DNN; and when the generator DNN is trained, generating, using the generator DNN, one or more test cases.

11. The method according to claim 10, wherein the determination includes a label and a score.

12. The method according to claim 10, the method further comprising determining that the generator DNN is trained when a predetermined number of training sessions are completed.

13. The method according to claim 12, the method further comprising determining a training session is completed when the generator DNN produces a predetermined number of test cases likely to expose a software vulnerability.

14. The method according to claim 10, wherein preprocessing the training data includes performing at least one selected from the group comprising padding the training data, normalizing the training data, re-formatting the training data, randomizing the order of the training data.

15. The method according to claim 10, the method further comprising receiving the training data from a historical data database, a target device, or both.

16. The method according to claim 10, the method further comprising:
sending the one or more test cases from the generator DNN to a fuzzer; and
using the fuzzer to test a target device or software module by sending the target device or software module one or more messages based on the one or more test cases.

17. The method according to claim 16, wherein the target device is an ECU included in a vehicle and configured to receive and send messages via a CAN bus.

18. The method according to claim 10, the method further comprising:
sending the one or more test cases from the generator DNN to a fuzzer; and
using the fuzzer to evaluate source code for unhandled exceptions.

* * * * *